Figure 1:
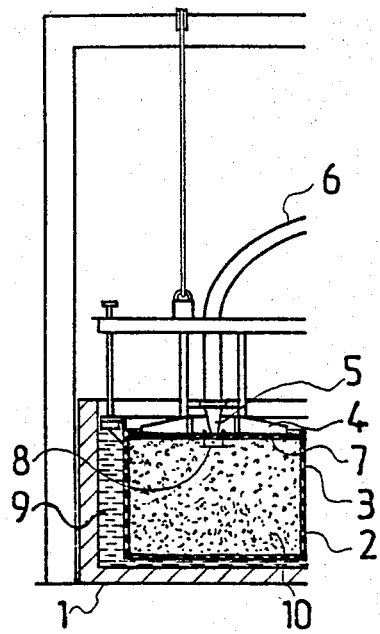

United States Patent [19]

Granberg et al.

[11] Patent Number: 4,509,413
[45] Date of Patent: Apr. 9, 1985

[54] PROCEDURE FOR TREATING CURD PARTICLES AND CHEESE MOULD FOR APPLYING THE PROCEDURE

[75] Inventors: Carl-Gustav Granberg, Paippinen; Heikki Kauppi, Helsinki, both of Finland

[73] Assignee: MKT-tehtaat Oy, Helsinki, Finland

[21] Appl. No.: 497,169

[22] Filed: May 27, 1983

[30] Foreign Application Priority Data

May 31, 1982 [FI] Finland .................. 821909

[51] Int. Cl.³ .................. A01J 25/00
[52] U.S. Cl. .................. 99/453; 99/459; 99/465; 100/110; 100/116; 425/84; 425/412
[58] Field of Search .................. 99/452, 453, 456–459, 99/460, 465; 100/104, 106–110, 116; 210/514, 515, 513, 518, 808, 361; 426/414, 413, 36, 478, 491, 512, 515, 582; 425/84, 85, 308, 412, 444

[56] References Cited

U.S. PATENT DOCUMENTS

| | | | |
|---|---|---|---|
| 2,494,638 | 1/1950 | Stine | 99/460 X |
| 2,942,983 | 6/1960 | Sadler et al. | 99/460 X |
| 3,295,205 | 1/1967 | Sjoholm | 99/458 X |
| 3,836,684 | 9/1974 | Pontecorvo | 426/478 X |
| 4,019,984 | 4/1977 | Mohn | 100/37 X |
| 4,440,073 | 4/1984 | Quilliou | 99/465 X |

Primary Examiner—Timothy F. Simone
Attorney, Agent, or Firm—Toren, McGeady and Stanger

[57] ABSTRACT

The present invention concerns a procedure for treating curd particles (10) produced in a cheese kettle, and a cheese mould (2) for applying the procedure, made of strainer sheet and provided with a separate cover part (4). The cheese mould (2) is placed in a tapping vat (1), where it separates the curd particles (10) tapped from the cheese kettle from the whey (9) accompanying them. It is essential in the invention that on the mould (2) is used a strainer-like cover part with which the mould is closed for the duration of curd particle tapping. By this expedient the necessity to level the curd particle surface before the subsequent pre-pressing step is avoided. In the pre-pressing, the strainer-like cover part (4) of the mould can be used, and the object of the pre-pressing step is to compact the particles into a cheese block that can be conveyed to further treatment.

4 Claims, 4 Drawing Figures

PROCEDURE FOR TREATING CURD PARTICLES AND CHEESE MOULD FOR APPLYING THE PROCEDURE

The present invention concerns a procedure for treating curd particles in a cheese mould located in the tapping vat, in which procedure the curd particles produced in the cheese kettle are tapped into a strainer-like cheese mould provided with a separate cover part, where the whey accompanying the particles is separated and where pressing of the particles is carried out.

The cheese-making process comprises the cooking step in the cheese kettle, wherein the milk is separated into curd particles and whey. The further treatment of the curd particles takes place in cheese moulds placed in the tapping vat, mixture of particles and whey being tapped into these by conduits from the cheese kettle. In the tapping step, the whey accompanying the particles prevents their contact with air, which in particular in making Swiss cheese would have a detrimental effect on the quality of the curd being made. In the cheese moulds, particles and whey are separated; the walls and bottoms of the moulds are therefore made of strainer sheet so that the whey can escape from the moulds through the perforations of the sheet. Most of the whey entering the moulds escapes already at the tapping step; for removing the rest, pre-pressing of the particles in each mould is carried out, in said pre-pressing a usually plate-like pressing member being used, which in the pressing step serves as cover of the mould. In an embodiment known in the art, a strainer plate lying against the pressing surface of the pressing member is used which allows escape of the whey also from the space between the particles being pressed and the pressing surface.

During the curd particle tapping step the height of the cheese mould may be increased with a strainer-like tapping frame preventing particles from escaping from the mould. The method of the prior art is then such that subsequent to the tapping step the tapping frame is removed and the surface of the curd particles is levelled in the cheese mould, this being done manually, whereafter the pre-pressing has been carried out by means of a plate-like pressing member.

The object of the present invention is to provide a procedure by which the treatment of curd particles can be made simpler and less cumbersome. The invention is characterized in that a strainer-like cover part is used in the cheese mould, by which the mould is closed during the tapping of curd parcticles.

The invention offers the primary advantage that thereby is avoided the manual levelling of the cheese particle surface. Experiments have shown that during the tapping step the particles can by the aid of the cover applied in position be spread in the mould uniformly enough to make any other levelling expedients unnecessary. In addition, by the aid of the cover part is ensured that no particles can escape over the rim of the mould, and therefore the tapping frame, if used, may be lower than before.

An advantageous embodiment of the procedure of the invention is characterized in that the curd particles are tapped into the mould through an aperture in the cover part, where the tapping conduit from the cheese kettle is connected.

Another embodiment of the procedure of the invention teaches that the cover part is used for pressing the particles after they have been tapped. The cover part is then used in such manner that during the particle tapping step it is placed to be a cover for the mould or for the tapping frame thereupon so that it closes the mould; subsequent to the tapping step it is so raised that the surface of the mould may be freed of the foam that has accumulated thereon, and finally it is pressed into the mould in order to accomplish the pre-pressing of the particles.

Further, an object of the invention is a cheese mould intended for applying the procedure, made of strainer sheet and provided with a separate cover part, which is located in the tapping vat so that the curd particles formed in the cheese kettle can be tapped into the mould to the purpose of whey separation and pressing of the particles. The cheese mould of the invention is characterized in that the cover part of the mould has been made to resemble a strainer and provided with an aperture to which the tapping conduit from the cheese kettle is connected.

In the cheese mould of the invention, the cover part may further serve as pressing member by which, subsequent to the tapping of curd particles, the pressing of the particles is carried out. It is then possible to mount in the aperture in the cover part a spreading nozzle protruding from the inner surface of the cover part and which during the curd particle tapping step spreads the particles over the entire area of the mould and being displaced during the pressing step in order to make the inner surface of the cover part a smooth pressing surface.

Figure 2:
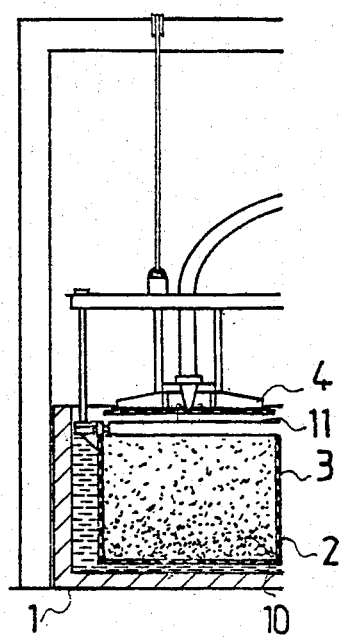
Figure 3:
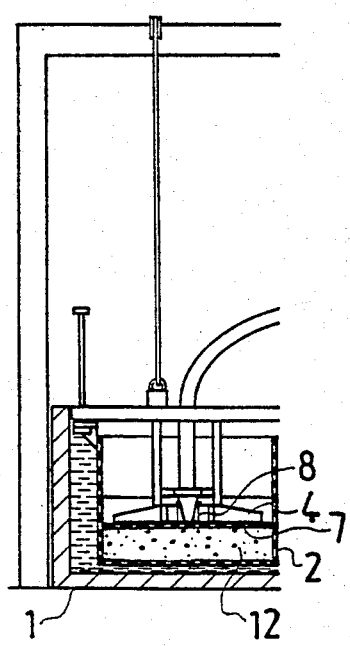
Figure 4:
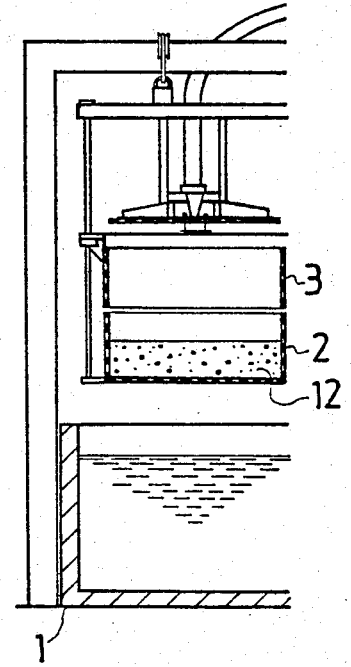

The invention is described in the following in detail with the aid of an example, referring to the drawing attached, illustrating the different steps of the procedure of the invention, wherein:

FIG. 1 illustrates the tapping of curd particles into the cheese mould in the tapping vat with the cover part in its place, FIG. 2 shows the removal of foam from the surface of the mould with the cover part of the mould lifted, FIG. 3 shows the pre-pressing of the curd particles accomplished with the aid of the cover part, and FIG. 4 shows the removal of the mould from the tapping vat.

The equipment used in the procedure as shown in the example comprises a plurality of cheese moulds 2 placed in the tapping vat 1, only one such mould being depicted in the drawing. The bottom and walls of the mould 2 have been made of strainer sheet and to the mould has furthermore been connected a tapping frame 3 made of strainer sheet, and which serves to increase the height of the walls of the mould. Over the mould 2 is mounted a vertically movable strainer-like cover part 4, the tapping conduit 6 from the cheese kettle (not shown) being connected to the aperture 5 therein. In the aperture 5 has been mounted a spreading nozzle 8 protruding from the inner surface 7 of the cover part 4 and which may be so moved with reference to the cover part so that a smooth inner surface is obtained. A situation like this is shown in FIG. 3 of the drawing.

The first step in the treatment of the curd particles is the tapping of the particles, depicted in FIG. 1, from the cheese kettle into the cheese mould 2 located in the tapping vat 1. Before commencement of tapping, some whey is conducted into the tapping vat 1, whereby is ensured that the curd particles cannot come into contact with air in connection with tapping. Tapping takes place through the conduit 6 and the spreading nozzle 8 when the cover part 4 is so placed on the tapping frame 3 that the mould 2 is closed. From the cheese kettle a mix of curd particles and whey enters the mould 2, and the whey 9 drains therefrom through the strainer surfaces of the mould to the outside of the mould, while the particles 10 remain in the mould. The whey surface 9 may rise during tapping to the extent that part of the whey drains in overflow from the tapping vat 1. On completion of the tapping, the mould 2 and the tapping frame 3 are filled with curd particles 10, which further contain whey in abundance.

In FIG. 2 is shown the removal of foam from the top of the cheese mould following after the tapping of the particles 10. To this end the cover part 4 has been lifted, and the foam is removed with a squeegee 11 running across the tapping frame 3.

The subsequent step of the treatment is the pre-pressing of the curd particles 10, depicted in FIG. 3, taking place by the aid of the cover part 4. The object of the pre-pressing is to further remove whey from the curd particles, and to transform the particles into a dense cheese block 12 which may be transferred to further treatment. As is seen in the figure, the spreading nozzle 8 has during this step been displaced with reference to the inner surface 7 of the cover part 4 so that this surface has become a smooth pressing surface.

In FIG. 4 is shown the removal of the cheese mould 2 from the tapping vat 1, which is the last step in the treatment. At this step the tapping frame 3 may be detached from the mould 2 containing the cheese block 12.

It is obvious to a person skilled in the art that different embodiments of the invention are not confined to the example presented in the foregoing and may vary within the scope of the claims stated below.

We claim:

1. An apparatus for treating a mixture of whey and curd particles obtained from the cooking step in a cheese-making process, said apparatus comprising a vat, at least one cheese mould positioned within said vat, said at least one cheese mould having a bottom part and side wall parts extending upwardly from said bottom part, said bottom part and said side wall parts are made of a strainer sheet capable of draining whey from the interior of said cheese mold, a separate strainer-like cover part positionable within said side wall parts and being vertically movable relative to said bottom part and side wall parts, said cover part having an opening for supplying whey and curd particles into said cheese mould, a supply conduit connected to said opening in said cover part for filling whey and curd particles into said cheese mould while said cheese mould is closed by said cover part.

2. An apparatus, as set forth in claim 1, including means for moving said cover part in the vertical direction relative to said side wall parts so that said cover part serves as a pressing member for pressing the curd particles located within said cheese mould.

3. An apparatus, as set forth in claim 1, wherein a spreading nozzle is located within the opening in said cover part and is arranged to protrude downwardly from the lower surface of said cover part to said cheese mould for spreading the curd particles over the entire area within said cheese mould, and said spreading nozzle being retractable upwardly into said cover and spaced upwardly from the lower surface of said cover part so that the lower surface of said cover part can provide a smooth pressing surface.

4. An apparatus, as set forth in claim 1, wherein said cheese mould is spaced within said vat so that a space is provided between said vat and cheese mould for receiving the whey passing out of said cheese mould through said strainer sheet, and means supporting said cheese mould within said vat so that said cheese mould can be lifted upwardly out of said cheese vat.

* * * * *